(12) United States Patent
Xu et al.

(10) Patent No.: US 9,134,572 B2
(45) Date of Patent: Sep. 15, 2015

(54) LIQUID CRYSTAL PANEL AND METHODS FOR FABRICATING LIQUID CRYSTAL PANEL, ARRAY SUBSTRATE, AND COLOR FILTER SUBSTRATE

(75) Inventors: Wanxian Xu, Beijing (CN); Xue Dong, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 164 days.

(21) Appl. No.: 13/310,871

(22) Filed: Dec. 5, 2011

(65) Prior Publication Data

US 2012/0138941 A1 Jun. 7, 2012

(30) Foreign Application Priority Data

Dec. 7, 2010 (CN) .......................... 2010 1 0585449

(51) Int. Cl.
| | |
|---|---|
| H01L 27/15 | (2006.01) |
| H01L 33/08 | (2010.01) |
| H01L 33/50 | (2010.01) |
| G02F 1/1337 | (2006.01) |
| G02F 1/1335 | (2006.01) |
| G02F 1/1339 | (2006.01) |

(52) U.S. Cl.
CPC ...... *G02F 1/133707* (2013.01); *G02F 1/13394* (2013.01); *G02F 1/133512* (2013.01)

(58) Field of Classification Search
CPC .......... H01L 27/15; H01L 33/08; H01L 33/50
USPC ......... 257/59, 72, E33.053, E27.121; 438/34, 438/29
See application file for complete search history.

(56) References Cited

U.S. PATENT DOCUMENTS

| 7,502,090 B2 | 3/2009 | Oh et al. | |
|---|---|---|---|
| 2009/0086134 A1* | 4/2009 | Yao et al. | 349/106 |
| 2009/0190084 A1* | 7/2009 | Sun | 349/157 |

FOREIGN PATENT DOCUMENTS

| CN | 1991488 A | 7/2007 |
|---|---|---|
| CN | 101055353 A | 10/2007 |
| CN | 101251689 A | 8/2008 |
| CN | 101329481 A | 12/2008 |

OTHER PUBLICATIONS

Third Chinese Office Action Appln. No. 201010585449.0; Dated Nov. 26, 2014.
First Chinese Office Action dated Jan. 3, 2014; Appln. No. 201010585449.0.
Second Chinese Office Action dated Jul. 2, 2014; Appln. No. 201010585449.0.

* cited by examiner

*Primary Examiner* — Asok K Sarkar
*Assistant Examiner* — Dmitriy Yemelyanov
(74) *Attorney, Agent, or Firm* — Ladas & Parry LLP (57) ABSTRACT

A liquid crystal display panel according to an embodiment of the disclosure comprises an array substrate and a color filter substrate, and primary spacers and protrusions are formed on the array substrate and the color filter substrate and contact each other, the protrusions corresponding to at least one of gate lines and data lines on the array substrate. Also, a method for manufacturing a liquid crystal display panel is provided.

8 Claims, 8 Drawing Sheets

LIQUID CRYSTAL PANEL AND METHODS FOR FABRICATING LIQUID CRYSTAL PANEL, ARRAY SUBSTRATE, AND COLOR FILTER SUBSTRATE

BACKGROUND

Embodiments of the present disclosure relates to a liquid crystal panel and a method for fabricating a liquid crystal panel, an array substrate and a color filter substrate.

A liquid crystal panel includes an array substrate and a color filter substrate with liquid crystal filled therebetween. Primary spacers and secondary spacers are provided between the array substrate and the color filter substrate for maintaining a cell gap. There is a level difference between the primary spacers and the secondary spacers so that amount of the liquid crystal may fluctuate in a certain range when the liquid crystal panel is pressed. In the prior art, a structure having the level difference between the primary spacers and the secondary spacers may be: the primary spacers and the secondary spacers are obtained by a mask patterning process on the color filter substrate, and the primary spacers and the secondary spacers have a same height. The primary spacers are disposed on thin film transistors higher than gate lines, while the secondary spacers are disposed on the gate lines and do not contact the array substrate.

SUMMARY

An embodiment of the present disclosure provides a liquid crystal panel comprising a color filter substrate and an array substrate. The array substrate has data lines and gate lines formed thereon intersecting each other to define pixel units, and the pixel units each comprise a thin film transistor and a pixel electrode. The thin film transistor may comprise a gate electrode, a source electrode, a drain electrode, and an active layer. The gate electrode may be connected to the gate line, the source electrode may be connected to the data line, the drain electrode may be connected to the pixel electrode, and the active layer may be formed between the gate electrode and the source and drain electrodes. Primary spacers and secondary spacers may be disposed between the array substrate and the color filter substrates, and a color resin unit and a black matrix may be formed on the color filter substrate, the color resin unit corresponding to the pixel electrodes on the array substrate, the black matrix corresponding to a region of the array substrate other than the pixel electrodes. On the array substrate and the color filter substrate are formed the primary spacers and protrusions in contact with each other, and the protrusions correspond to at least one of the gate lines and the data lines of the array substrate.

Another embodiment of the present disclosure provides a method for forming an array panel, comprising: forming gate lines, gate electrodes, data lines, source electrodes, drain electrodes, active layers, pixel electrodes, and insulating layers on a substrate by patterning processes; and during the forming of the gate lines, the gate electrodes, the data lines, the source electrodes, the drain electrodes, the active layers, the pixel electrodes, and the insulating layers, forming protrusions corresponding to at least one of the gate lines and the data lines by the patterning processes.

Further another embodiment of the present disclosure provides a method for forming a liquid crystal panel, comprising the forgoing method for forming the array substrate, the method further comprising: forming a color filter substrate, a color resin unit and a black matrix being formed on the color filter substrate, the color resin unit corresponding to the pixel electrodes on the array substrate, and the black matrix corresponding to a region of the array substrate other than the pixel electrodes; forming primary spacers and secondary spacers on the color filter substrate, the primary spacers and the secondary spacers being formed simultaneously and having a same thickness, the primary spacers corresponding to the protrusions; attaching the array substrate and the color filter substrate to each other, such that the primary spacers are in contact with the protrusions.

Still another embodiment of the present disclosure provides a method for forming a color filter substrate, comprising forming a color resin unit and a black matrix, the color filter substrate being combined with an array substrate to form a liquid crystal panel, the color resin unit corresponding to pixel electrodes on the array substrate, the black matrix corresponding to a region of the array substrate other than the pixel electrodes, the method comprising: forming the black matrix, the color resin unit, and a color-blocking pattern by patterning processes, the black matrix and the color-blocking pattern forming protrusions that correspond to at least one of gate lines and data lines of the array substrate, the color-blocking pattern and the color resin unit being formed simultaneously, and being formed above or below the black matrix.

Further still another embodiment of the present disclosure provides a method for forming a liquid crystal panel, comprising the forgoing method for forming the color filter substrate, the method further comprising: forming an array substrate, the array substrate having data lines and gate lines formed thereon intersecting each other to define pixel units, the pixel units each comprising a thin film transistor and a pixel electrode, wherein the thin film transistor comprises a gate electrode, a source electrode, a drain electrode and an active layer, the gate electrode is connected to the gate line, the source electrode is connected to the data line, the drain electrode is connected to the pixel electrode, the active layer is formed between the gate electrode and the source and drain electrodes; forming primary spacers and secondary spacers on the array substrate, the primary spacers and the secondary spacers being formed simultaneously and having a same thickness, the primary spacers corresponding to the protrusions; and attaching the array substrate and the color filter substrate to each other, such that the primary spacers contact the protrusions.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

BRIEF DESCRIPTION OF THE DRAWINGS

The present disclosure will become more fully understood from the detailed description given hereinafter and the accompanying drawings which are given by way of illustration only, and thus are not limitative of the present disclosure and wherein:

FIG. 5(a) is a sectional view taken along a line A-A in FIG. 5, according to an embodiment of the present disclosure;

FIG. 5(b) is a sectional view taken along a line A-A in FIG. 5, according to another embodiment of the present disclosure;

FIG. 5(c) is a sectional view taken along a line A-A in FIG. 5, according to still another embodiment of the present disclosure;

FIG. 6(a) is a sectional view taken along a line B-B in FIG. 6, according to an embodiment of the present disclosure;

FIG. 6(b) is a sectional view taken along a line B-B in FIG. 6, according to another embodiment of the present disclosure;

FIG. 6(c) is a sectional view taken along a line B-B in FIG. 6, according to still another embodiment of the present disclosure;

FIG. 7(a) is a sectional view taken along a line C-C in FIG. 7;

FIGS. 8(a1) and 8(a2) show an intermediate structure of the array substrate in FIG. 5 at the steps 801~802;

FIGS. 8(b1) and 8(b2) show an intermediate structure of the array substrate in FIG. 5 at the step 803;

FIGS. 8(c1) and 8(c2) show an intermediate structure of the array substrate in FIG. 5 at the step 804; and FIGS. 8(d1) and 8(d2) show an intermediate structure of the array substrate in FIG. 5 at the steps 805~806.

DETAILED DESCRIPTION

Reference will now be made in detail to various embodiments in accordance with the present disclosure, examples of which are illustrated in the accompanying drawings. While the disclosure will be described in conjunction with various embodiments, it will be understood that these various embodiments are not intended to limit the disclosure. On the contrary, the disclosure is intended to cover alternatives, modifications and equivalents, which may be included within the scope of the disclosure as construed according to the claims.

In a process of making the technology of the present disclosure, the inventors found that to ensure uniformity in thickness of the liquid crystal panel is a foundation of high displaying quality, and the primary spacers function not only to support the cell gap of the liquid crystal cell, but also to maintain the uniform thickness of the liquid crystal panel. Since the surface of the TFT is uneven, the array substrate has to be aligned to the color filter substrate with high precision in order to maintain the uniform thickness of the liquid crystal panel. During fabrication of the liquid crystal display panel, however, alignment deviation may occur between the array substrate and the color filter substrate, which adversely affect the uniformity of the thickness of the liquid crystal display panel.

Furthermore, in the following detailed description of various embodiments in accordance with the disclosure, numerous specific details are set forth in order to provide a thorough understanding of the disclosure. However, it will be recognized by one of ordinary skill in the art that the disclosure may be practiced without these specific details. In other instances, well known methods, procedures, components, and circuits have not been described in detail as not to unnecessarily obscure aspects of the disclosure.

In order to resolve the problem in the prior art that the alignment deviation between the array substrate and the color filter substrate may affect uniformity of thickness of the liquid crystal display panel when the primary spacers are provided on the uneven surface of the TFTs, various embodiments of the present disclosure provides a liquid crystal panel and methods for manufacturing a liquid crystal panel, an array substrate and a color filter substrate.

A liquid crystal panel in accordance with an embodiment of the present disclosure comprises an array substrate and a color filter substrate.

Figure 1:
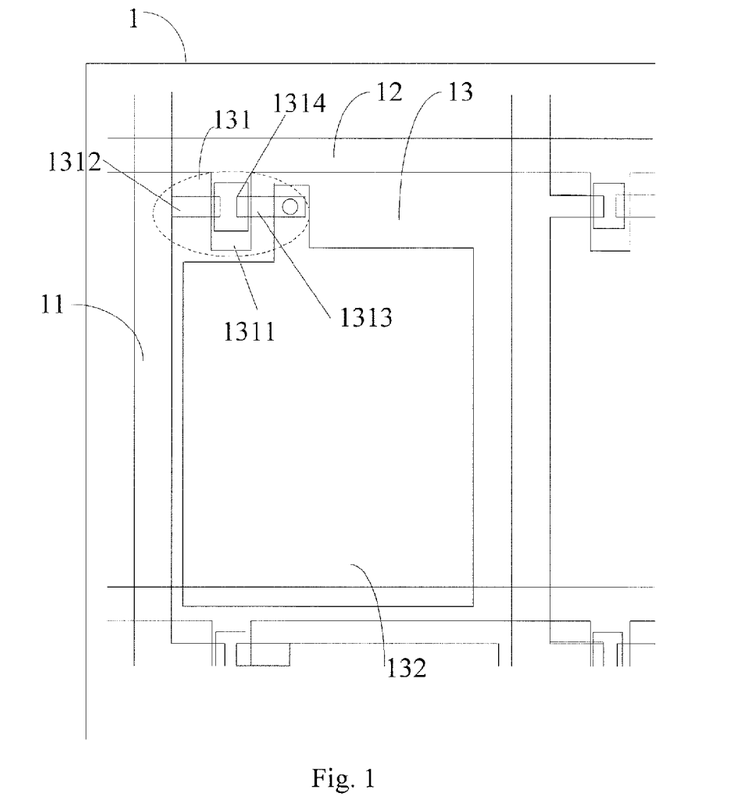
FIG. 1 is a schematic view showing a structure of an array substrate in a liquid crystal panel in accordance with a first embodiment of the present disclosure.

Referring to FIG. 1, data lines 11 and gate lines 12 are formed on the array substrate 1, intersecting each other to thus enclose respective pixel units 13. The pixel units 13 each include a thin film transistor (TFT) 131 and a pixel electrode 132, and the thin film transistor 131 further comprises a gate electrode 1311, a source electrode 1312, a drain electrode 1313 and an active layer 1314. The gate electrode 1311 is connected to the gate line 12, and the source electrode 1312 is connected to the data line 11. The drain electrode 1313 is connected to the pixel electrode 132, and the active layer 1312 is formed between the gate electrode 1311, the source electrode 1312 and the drain electrode 1313.

Figure 2:
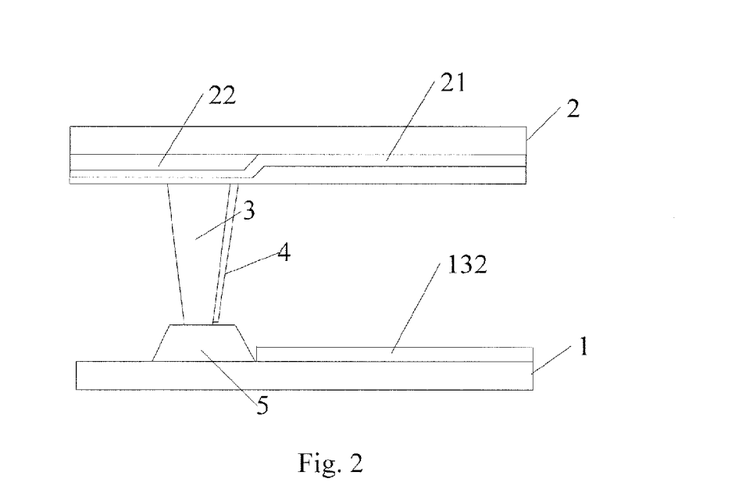
FIG. 2 is a schematic sectional view of a liquid crystal panel in accordance with an embodiment of the present disclosure.

With reference to FIG. 2, a primary spacer 3 and a secondary spacer 4 may be provided between the array substrate 1 and a color filter substrate 2. The color filter substrate 2 may have a color resin unit 21 and a black matrix 22 formed thereon. The color resin unit 21 may be located corresponding to the pixel electrode 132 on the array substrate 1, and the black matrix 22 may be located corresponding to a region of the array substrate 1 other than the pixel electrode 132. A protrusion 5 may be disposed on the array substrate 1 corresponding to the gate line 12 or the date line 11, and the primary spacer 3 may be formed on the color filter substrate 2 corresponding to and in contact with the protrusion 5.

Figure 3:
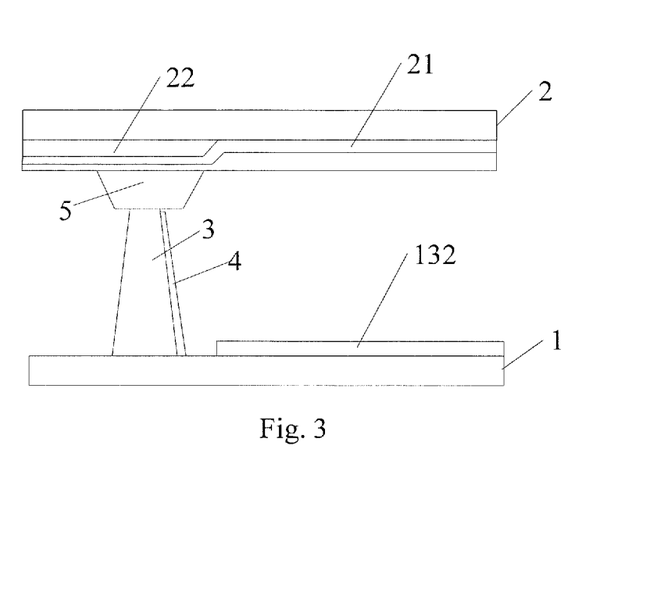
FIG. 3 is a schematic sectional view of a liquid crystal panel in accordance with another embodiment of the present disclosure.

Alternatively, as shown in FIG. 3, the primary spacer 3 and the secondary spacer 4 may be disposed between the array substrate 1 and the color filter substrate 2 having the color resin unit 21 and the black matrix 22 formed thereon. The color resin unit 21 may correspond to the pixel electrode 132 on the array substrate 1, and the black matrix 22 may correspond to a region of the array substrate 1 other than the pixel electrode 132. The protrusion 5 may be disposed on the color filter substrate 2 corresponding to the gate line 12 or the date line 11 on the array substrate 1. The primary spacer 3 may be formed on the array substrate 1 corresponding to and in contact with the protrusion 5.

In the case that the protrusion 5 is formed on the color filter substrate 2, the protrusion 5 is positioned on the black matrix 22 of the color filter substrate 2, corresponding to the gate line 12 or the data line 11 on the array substrate 1, and the protrusion 5 may be formed of a color-blocking pattern and the black matrix.

Further, the primary spacer and the secondary spacer may be formed on the array substrate and have a same thickness.

In accordance with the embodiment of the present disclosure, since the liquid crystal panel comprises the protrusion disposed between the array substrate and the color filter substrate corresponding to the gate line or the data line and contacting the primary spacer, the primary spacer may be in contact with the protrusion instead of the TFT, thereby resolving the problem in the prior art that the alignment deviation between the array substrate and the color filter substrate may affect uniformity of thickness of the liquid crystal display panel when the primary spacers are provided on the uneven surface of the TFT.

Figure 4:
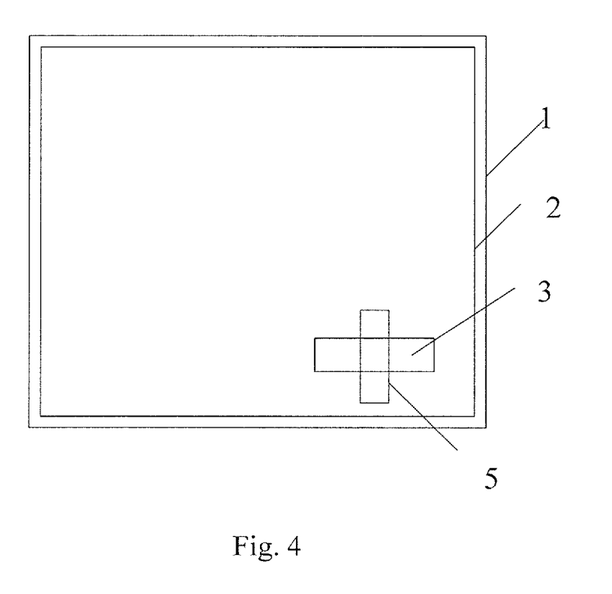
FIG. 4 is a schematic top view of the liquid crystal panel as shown in FIG. 2.

Furthermore, in order to make the contact area between the primary spacer and the protrusion constant, in the embodiment of the present disclosure, as shown in FIG. 4, the primary spacer 3 and the protrusion 5 each are formed in an elongate shape, and the elongated directions of the primary spacer 3 and the protrusion 5 are perpendicular to each other. Preferably, a surface of the primary spacer 3 facing the protrusion 5 may have a rounded rectangular shape, an elliptical rectangular shape or a rectangular shape, and a surface of the protrusion 5 facing the primary spacer 3 may have a rounded rectangular shape, an elliptical rectangular shape or a rectangular shape.

Figure 5:
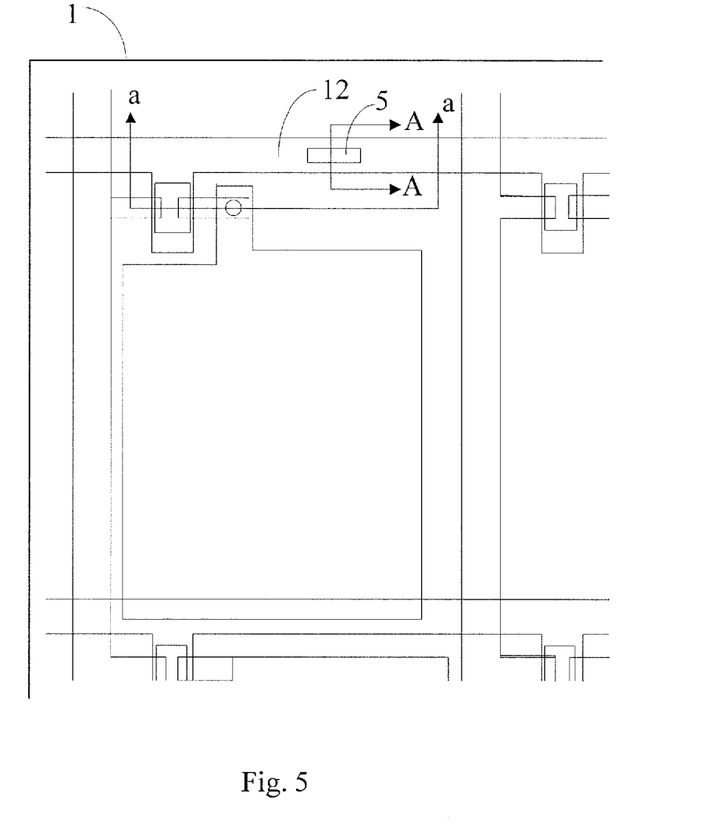
FIG. 5 is a schematic view showing a structure of an array substrate in a liquid crystal panel in accordance with a second embodiment of the present disclosure.

In addition, when the protrusion 5 is formed on the array substrate, in order to prevent the manufacture process of the array substrate from being complicated by the formation of the protrusion, the implementation of the protrusion 5 includes but is not limited to following ways:

(1) As shown in FIG. 5, the protrusion 5 may be formed at a position corresponding to the gate line 12 of the array substrate 1, and the forming of the protrusion 5 may include but is not limited to following ways:

with reference to FIG. 5(a), an thin active layer film on the array substrate 1 may be etched to form an active layer pattern 51 corresponding to the position of the gate line 12, and the active layer pattern 51 may block up an insulating layer 14 thereon to form the protrusion 5 corresponding to the gate line 12; or with reference to FIG. 5(b), a data line metal layer on the array substrate 1 may be etched to form a data line metal layer pattern 52 corresponding to the position of the gate line 12, and the data line metal layer pattern 52 may block up the insulating layer 14 thereon so as to form the protrusion 5 corresponding to the gate line 12; or with reference to FIG. 5(c), the active layer thin film on the array substrate 1 may be etched to form the active layer pattern 51 corresponding to the position of the gate line 12, and the data line metal layer is etched to form the data line metal layer pattern 52 overlapping the active layer pattern 51, so that the insulating layer 14 on the data line metal layer may be blocked up by the active layer pattern 51 and the data line metal layer pattern 52 to thus form the protrusion 5 corresponding to the gate line 12.

Further, in order to make the contact area between the primary spacer and the protrusion as large as possible, the elongating direction of the protrusion corresponding to the gate line may be parallel with the gate line.

In addition, the primary spacer and the secondary spacer may be formed on the color filter substrate 2 with a same thickness.

Figure 6:
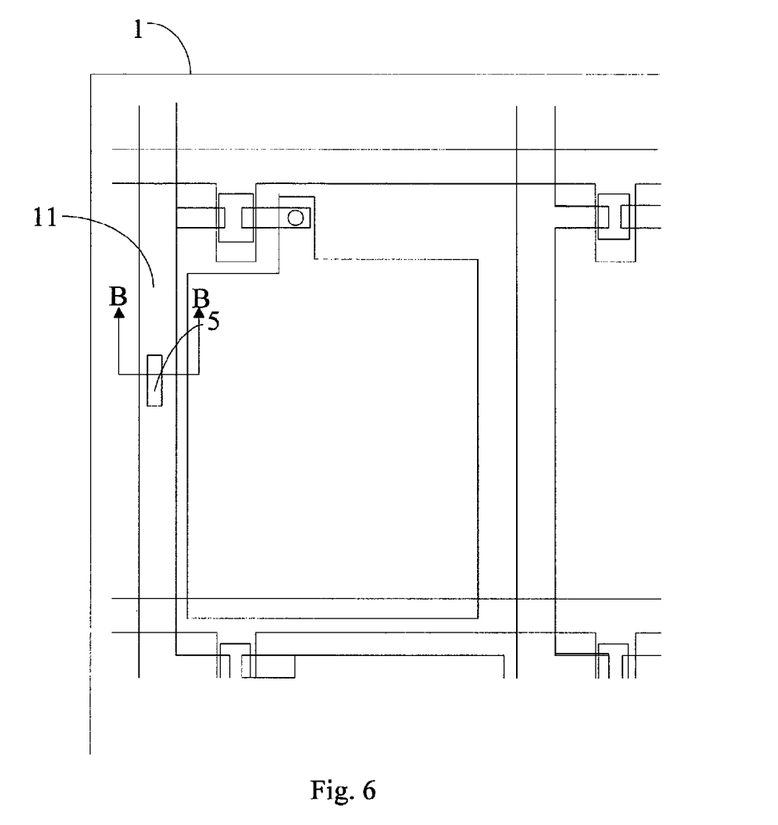
FIG. 6 is a schematic view showing a structure of an array substrate in a liquid crystal panel in accordance with a third embodiment of the present disclosure.

(2) As shown in FIG. 6, the protrusion 5 may be formed at a position corresponding to the data line 11 of the array substrate 1, and the forming of the protrusion 5 may include but is not limited to following ways:

As shown in FIG. 6 (a), a gate line metal layer on the array substrate 1 may be etched to form a gate line metal layer pattern 53 corresponding to the position of the data lines 11, and the data line 11 and the insulating layer 14 on the gate line metal layer may be blocked up by the gate line metal layer pattern 53 to form the protrusion 5 corresponding to the data line 11; or As shown in FIG. 6 (b), an active layer thin film on the array substrate 1 may be etched to form an active layer pattern 51 corresponding to the position of the data line 11, and the data line 11 and the insulating layer 14 on the active layer thin film may be blocked up by the active layer pattern 51 so as to form the protrusion 5 corresponding to the data line 11; or As shown in FIG. 6 (c), a gate line metal layer on the array substrate 1 may be etched to form a gate line metal layer pattern 53 corresponding to the position of the data line 11, and an active layer thin film may be etched to form an active layer pattern 51 overlapping the gate line metal layer pattern 53, so that the data line 11 and the insulating layer 14 on the active layer thin film may be blocked up by the active layer pattern 51 and the gate line metal layer pattern 53 to form the protrusion 5 corresponding to the data line.

Further, in order to make the contact area between the primary spacer and the protrusion as large as possible, the elongating direction of the protrusion corresponding to the data line may be parallel with the data line.

In addition, the primary spacer and the secondary spacer may be formed on the color filter substrate with a same thickness.

Figure 7:
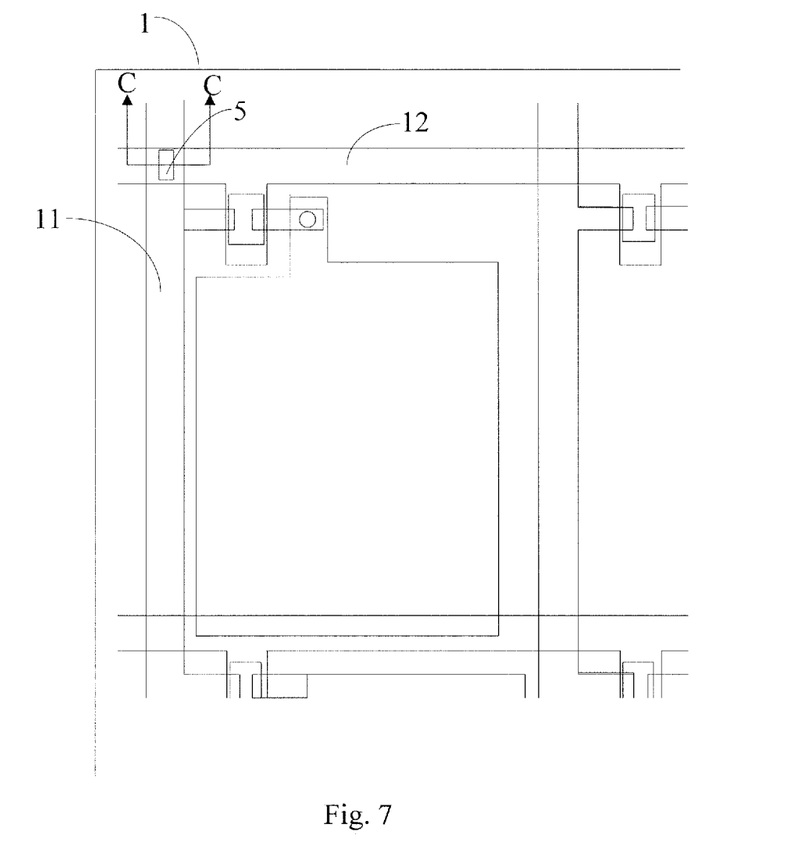
FIG. 7 is a schematic view showing a structure of an array substrate in a liquid crystal panel in accordance with a fourth embodiment of the present disclosure.

(3) As shown in FIG. 7, the protrusion 5 may be formed at the intersection between the gate line 12 and the data line 11 on the array substrate 1, and the forming of the protrusion 5 may include but is not limited to the following way:

As shown in FIG. 7 (a), an active layer thin film on the array substrate 1 may be etched to form an active layer pattern 51 corresponding to the intersection between the gate line 12 and the data line 11, and thus the data line 11 and the insulating layer 14 on the active layer thin film may be blocked up by the active layer pattern 51 to form the protrusion 5 corresponding to the intersection between the gate line 12 and the data line 11.

Further, in order to make the contact area between the primary spacer and the protrusion as large as possible, the elongating direction of the protrusion corresponding to the intersection between the gate line and the data line may be parallel with the gate line or the data line.

In addition, the primary spacer and the secondary spacer may be formed on the color filter substrate with a same thickness.

A method for manufacturing an array substrate in accordance with an embodiment of the present disclosure may comprise:

(1) forming gate lines, gate electrodes, data lines, source electrodes, drain electrodes, active layers, pixel electrodes, and insulating layers on a substrate;

(2) during the forming of the gate lines, the gate electrodes, the data lines, the source electrodes, the drain electrodes, the active layers, the pixel electrodes, and the insulating layers on the substrate, forming protrusions corresponding to the gate lines or the data lines by a patterning process.

In the method for manufacturing the array substrate in accordance with the embodiment of the present disclosure, since the protrusions are disposed to correspond to the gate lines or the data lines and contact the primary spacers, the primary spacers may contact the protrusions instead of TFTs, so that the problem that the alignment deviation between the array substrate and the color filter substrate may affect uniformity of thickness of the liquid crystal display panel when the primary spacers are provided on the uneven surface of the TFTs may be resolved.

Another embodiment of the present disclosure may provide a method for manufacturing an array substrate comprising: forming gate lines, gate electrodes, data lines, source electrodes, drain electrodes, active layers, pixel electrodes, and insulating layers on a substrate; during the forming of the active layers, etching an active layer thin film by a patterning process so as to form an active layer pattern corresponding to the position of the gate lines; and during the forming of the data lines, the source electrodes and the drain electrodes, etching a data line metal layer by a patterning process so as to form a data line metal layer pattern overlapping the active layer pattern, the insulating layer on the data line metal layer being blocked up by the active layer pattern and the data line metal layer pattern to form a protrusion corresponding to the data line.

Figure 8:
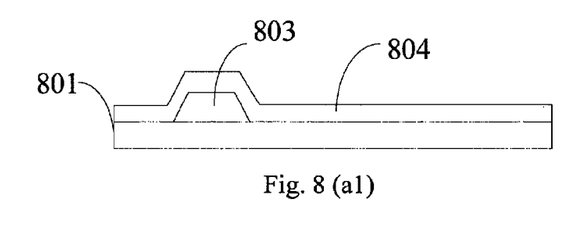

More particularly, the method for manufacturing the array substrate comprises:

Step 801, as shown in FIGS. 8(a1) and 8(a2), forming a gate metal layer thin film on a substrate 801 by a deposition process, and then etching the gate metal layer thin film by a mask patterning process to form a gate pattern including gate lines 802 and gate electrodes 803 of thin film transistors;

Step 802, as shown in FIGS. 8(a1) and 8(a2), forming a gate electrode insulating thin film 804 by a deposition process on the substrate having the gate pattern formed thereon;

Step 803, as shown in FIGS. 8(b1) and 8(b2), forming an active layer thin film by a deposition process on the substrate having the gate electrode insulating thin film formed thereon, and then etching the active layer thin film by a mask patterning process to form an active layer 805 overlapping the gate electrode 803 of the thin film transistor and an active layer pattern 806 corresponding to the gate line 802;

Step 804, as shown in FIGS. 8(c1) and 8(c2), forming a data line metal layer thin film on the substrate having the active layer, and then etching the data line metal line thin film by a mask patterning process to form a source/drain pattern and a data line metal layer pattern 807 overlapping the active layer pattern 806, the source/drain pattern including the data lines that are parallel with each other and intersect the gate scanning lines, and source and drain electrodes 808 and 809 of the thin film transistors;

Step 805, as shown in FIGS. 8(d1) and 8(d2), forming a passivation thin film 810 by a deposition process on the substrate resulting from the step 804, and then etching the passivation thin film 810 by a mask patterning process to form a via hole 811 exposing the drain electrode 809 of the thin film transistor;

Step 806, as shown in FIGS. 8(d1) and 8(d2), depositing a layer of transparent electrode material on the passivation thin film having the via hole, and then etching the layer of transparent electrode material by a mask patterning process to form a pixel electrode 812, the pixel electrode 812 being connected to the drain electrode 809 of the thin film transistor through the via hole 811.

In the present embodiment, the insulating layer on the data line metal layer is blocked up by the active layer pattern and the data line metal layer pattern so as to form a protrusion corresponding to the gate line.

It will be recognized the protrusion corresponding to the gate line may be formed by providing the active layer pattern to block up the insulating layer formed thereon, as shown in FIG. 5(a), or by providing the data line metal layer pattern to block up the insulating layer located on the data line metal layer, as shown in FIG. 5(b). The two types of protrusions may be formed by the manufacturing method as shown in FIG. 8 except that part of the process in the step 803 or 804 may be omitted, and a detailed description thereof is not repeated herein.

Further, the protrusion may be positioned corresponding to the data line or the intersection between the gate line and the data line.

In a case that the protrusion corresponds to the data line, the method for manufacturing the array substrate may comprise: forming gate lines, gate electrodes, data lines, source electrodes, drain electrodes, active layers, pixel electrodes and insulating layers on a substrate; during the forming of the gate lines and the gate electrodes, etching a gate line metal layer by a patterning process to form a gate line metal layer pattern corresponding to the data line; during the forming of the active layers, etching an active layer thin film by a patterning process to form an active layer pattern overlapping the gate line metal layer pattern, the data line and the insulating layer on the active layer thin film being blocked up by the active layer pattern and the gate line metal layer pattern to form a protrusion corresponding to the data line, as shown in FIG. 6(c). The manufacture thereof may be the same as the forgoing manufacture methods, so the description thereof is not repeated herein.

In addition, the protrusion corresponding to the data line may be formed by providing the gate line metal layer pattern to block up the data line and the insulating layer located on the gate line metal layer, as shown in FIG. 6(a), or by providing the active layer pattern to block up the data line and the insulating layer located on the active layer thin film, as shown in FIG. 6(b). The manufacture thereof may be the same as the forgoing manufacture methods, so the description thereof is not repeated herein.

In a case that the protrusion correspond to the intersection between the gate line and the data line, the method for manufacturing the array substrate may comprise: forming gate lines, gate electrodes, data lines, source electrodes, drain electrodes, active layers, pixel electrodes and insulating layers on a substrate; during the forming of the active layer, etching an active layer thin film by a patterning process to form an active layer pattern corresponding to the intersection between the gate line and the data line, the data line and the insulating layer on the active layer thin film being blocked up by the active layer pattern to form the protrusion corresponding to the intersection between the gate line and the data line. The manufacture thereof may be the same as the forgoing manufacture methods, so the description thereof is not repeated herein.

In the method for manufacturing the array substrate in accordance with an embodiment of the present disclosure, since the protrusions are disposed to correspond to the gate lines or the data lines and be in contact with the primary spacers, the primary spacers may contact the protrusions instead of TFTs, thereby resolving the problem that the alignment deviation between the array substrate and the color filter substrate may affect uniformity of thickness of the liquid crystal display panel when the primary spacers are provided on the uneven surface of the TFTs.

An embodiment of the present disclosure provides a method for manufacturing a liquid crystal panel, comprising: the method for manufacturing the array substrate as described above; forming a color filter substrate having color resin unit and a black matrix formed thereon, the color resin unit corresponding to the pixel electrodes on the array substrate, and the black matrix corresponding to a region of the array substrate other than the pixel electrodes; forming primary spacers and secondary spacers with a same thickness simultaneously on the color filter substrate, the primary spacers corresponding to the protrusions; attaching the array substrate and the color filter substrate such that the primary spacers contact the protrusions.

In the method for manufacturing the liquid crystal display panel in accordance with an embodiment of the present disclosure, since the protrusions are disposed between the array substrate and the color filter substrate so as to correspond to the gate lines or the data lines and contact the primary spacers, the primary spacers may contact the protrusions instead of TFTs, thereby resolving the problem that the alignment deviation between the array substrate and the color filter substrate may affect uniformity of thickness of the liquid crystal display panel when the primary spacers are provided on the uneven surface of the TFTs.

A method for manufacturing the color filter substrate in accordance with an embodiment of the present disclosure may comprise:

forming a color resin unit and a black matrix, and attaching the color filter substrate and the array substrate to form a liquid crystal panel, the color resin unit corresponding to pixel electrodes on the array substrate, and the black matrix corresponding to a region of the array substrate other than the pixel electrodes, wherein, a color-blocking pattern is formed simultaneously with the color resin unit by a patterning process, the color-blocking pattern overlapping the black matrix and forming protrusions together with the black matrix, the protrusions corresponding to the gate lines or the data lines on the array substrate, the color-blocking pattern being formed simultaneously with the color resin unit and located above or below the black matrix.

In the method for manufacturing the color filter substrate in accordance with an embodiment of the present disclosure, since the protrusions are disposed between the array substrate and the color filter substrate so as to correspond to the gate lines or the data lines and contact the primary spacers, the primary spacers may contact the protrusions instead of TFTs, thereby resolving the problem in the prior art that the alignment deviation between the array substrate and the color filter substrate may affect uniformity of thickness of the liquid crystal display panel when the primary spacers are provided on the uneven surface of the TFTs.

A method for manufacturing a liquid crystal panel in accordance with an embodiment of the present disclosure comprises: the above method for forming a color filter substrate; and forming an array substrate. Data lines and gate lines are formed on the array substrate and intersect each other to define pixel units, each of which includes a thin film transistor and a pixel electrode. The thin film transistor includes a gate electrode, a source electrode, a drain electrode and an active layer, the gate electrode being connected to the gate line, the source electrode being connected to the data line, the drain electrode being connected to the pixel electrode, and the active layer being formed between the gate electrode and the source and drain electrodes. Primary and secondary spacers are formed on the array substrate simultaneously and have a same thickness, the primary spacers corresponding to the protrusions. The array substrate and the color filter substrate are attached to each other such that the primary spacers contact the protrusions.

In the method for manufacturing the liquid crystal display panel in accordance with an embodiment of the present disclosure, since the protrusions are disposed between the array substrate and the color filter substrate so as to correspond to the gate lines or the data lines and contact the primary spacers, the primary spacers may contact the protrusions instead of TFTs, thereby resolving the problem in the prior art that the alignment deviation between the array substrate and the color filter substrate may affect uniformity of thickness of the liquid crystal display panel when the primary spacers are provided on the uneven surface of the TFTs.

The liquid crystal panel and the methods for manufacturing the liquid crystal panel, the array substrate, and the color filter substrate in accordance with the various embodiments of the present disclosure can be applied to an apparatus having a liquid crystal display panel.

The embodiment of the disclosure being thus described, it will be obvious that the same may be varied in many ways. Such variations are not to be regarded as a departure from the spirit and scope of the disclosure, and all such modifications as would be obvious to those skilled in the art are intended to be included within the scope of the following claims.

What is claimed is:

1. A liquid crystal panel, comprising:
   a color filter substrate; and
   an array substrate, the array substrate having data lines and gate lines formed thereon intersecting each other to define pixel units, the pixel units each comprising a thin film transistor and a pixel electrode,
   wherein the thin film transistor comprises a gate electrode, a source electrode, a drain electrode, and an active layer, the gate electrode is connected to the gate line, the source electrode is connected to the data line, the drain electrode is connected to the pixel electrode, the active layer is formed between the gate electrode and the source and drain electrodes, primary spacers and secondary spacers are disposed between the array substrate and the color filter substrate, a color resin unit and a black matrix is formed on the color filter substrate, the color resin unit corresponds to the pixel electrodes on the array substrate, the black matrix corresponds to a region of the array substrate other than the pixel electrodes,
   wherein the primary spacers are formed on the color filter substrate and the protrusions are formed on the array substrate, and the primary spacers and the protrusions are in contact with each other such that the primary spacers and their respective contacting protrusions extend between the array substrate and the color filter substrate,
   the protrusions correspond to the gate lines or the data lines of the array substrate and not the gate electrode of the thin film transistor, such that the primary spacers are between the protrusion and the color filter substrate and are not between the thin film transistor and the color filter substrate, and
   the protrusions comprise a laminated structure of an active layer pattern and one or more selected from the group consisting of a gate line metal layer pattern, an insulating layer, and a data line metal layer pattern.

2. The liquid crystal panel of claim 1, wherein the primary spacers and the protrusions are formed in an elongated shape, and the elongating directions of the primary spacers and the protrusions are perpendicular to each other.

3. The liquid crystal panel of claim 1, wherein:
   an elongating direction of the protrusion corresponding to the gate line is parallel with the gate line; or
   an elongating direction of the protrusion corresponding to the data line is parallel with the data line; or
   an elongating direction of the protrusion corresponding to the intersection of the gate line and the data line is parallel with at least one of the gate line and the data line.

4. The liquid crystal panel of claim 1, wherein:
   the active layer thin film on the array substrate is etched to form the active layer pattern corresponding to the gate line, and the insulating layer on the active layer thin film is blocked up by the active layer pattern to form the protrusion corresponding to the gate line.

5. The liquid crystal panel of claim 1, wherein the active layer thin film on the array substrate is etched to form the active layer pattern corresponding to the gate line, and the data line metal layer on the array substrate is etched to form the data line metal layer pattern overlapping the active layer pattern, the insulating layer on the data line metal layer is blocked up by the active layer pattern and the data line metal layer pattern to form the protrusion corresponding to the gate line.

6. The liquid crystal panel of claim 1, the active layer thin film on the array substrate is etched to form the active layer pattern corresponding to the data line, and the data line and the insulating layer on the active layer thin film are blocked up by the active layer pattern to form the protrusion corresponding to the data line.

7. The liquid crystal panel of claim 1, wherein the gate line metal layer on the array substrate is etched to form the gate line metal layer pattern corresponding to the data line, and the active layer thin film on the array substrate is etched to form the active layer pattern overlapping the gate line metal layer pattern, the data line and the insulating layer on the active layer thin film are blocked up by the gate line metal layer pattern and the active layer pattern to form the protrusion corresponding to the data line.

8. The liquid crystal panel of claim 1, wherein the active layer thin film on the array substrate is etched to form the active layer pattern corresponding to an intersection of the gate line and the data line, and the data line and the insulating layer on the active layer thin film are blocked up by the active layer pattern to form the protrusion corresponding to the intersection of the gate line and the data line.

\* \* \* \* \*